Patented June 13, 1950

2,511,171

UNITED STATES PATENT OFFICE 2,511,171

FLOCKING CEMENT AND METHOD OF FLOCKING

Robert W. Mitchell, Morristown, N. J., assignor to B. B. Chemical Co., Boston, Mass., a corporation of Massachusetts No Drawing. Application October 16, 1946, Serial No. 703,486

7 Claims. (Cl. 117—25)

This invention relates to the formation of flock-covered surfaces and particularly to a new adhesive composition for application through a stencil to selected areas on a porous surface.

Stencil flocking involves pressing a stencil against a fabric or other porous surface, applying a cement to the surface left exposed by the stencil, removing the stencil, and applying flock to the adhesive-coated surface.

An adhesive for use in flocking must be soft enough to allow flock to become embedded but must dry in a reasonable time. The adhesive must possess sufficient body so that it does not puddle through a fabric, and, on the other hand, must be sufficiently fluid to be readily applicable by known devices and to be able to penetrate the cloth and to be forced into all corners of the stencil.

Stencil flocking adhesives heretofore used comprised essentially a drying oil, thinner, and pigments together with a plasticizer and other additives. It has been found that these adhesives impart an undesirable stiffness to the fabric to which they are applied. Also, because of insufficient flexibility and resilience of the applied adhesive, some difficulty has been encountered in providing satisfactory resistance to the mechanical and chemical treatment encountered in the washing and dry cleaning of such coated fabrics. It has been proposed to substitute solvent type rubber cements as adhesives for stencil flocking. However, where such adhesives contain sufficient rubberlike material to give them sufficient body to prevent striking through, the adhesive forms strands, strings, or webs between the coated area and the edges of the stencil when the stencil is removed from the surface prior to application of flock.

Attempts to use a latex of a rubberlike material have been unsuccessful because the latex is too fluid and puddles through the fabric or spreads out past the determined area when the stencil is removed. Also, latex coatings frequently possess poor wash resistance.

A general object of the invention is to provide a flocking cement which will obviate these and other difficulties, a method of using this cement with a stencil, and a finished article.

In accordance with the present invention there is formed a new type of cement comprising a continuous phase composed of a hardenable liquid such as a drying oil, a drying resin, or a solution of oil, resin or both, in a balanced solvent mixture; and a disperse phase comprising droplets of a latex or droplets of an aqueous dispersion of an elastomer. The term "elastomer" as used herein includes flexible film-forming resins such as polymers, copolymers and condensation products, and also mixtures of resins and mixtures of resins and plasticizers. Suitable hardenable liquids for the continuous phase are the known natural or synthetic oils, resins, or oil and resin mixtures which can be hardened by oxidation, heat, or other controlled conditions to a water and "dry cleaning" solvent resistant state. The hardenable liquid may include a mineral filler. Although applicant does not wish to be bound to the following theory, it appears that the latex or dispersion forms a flexible film of solids on the surface to be flocked; and the hardenable liquid forms a waterproof protective coating for the solids deposited from the latex or dispersion.

In a preferred form comprising a latex or elastomer dispersion and a solution of a drying oil or resin in mixed volatile organic solvents, the particles of elastomer in the latex or dispersion become swelled by the solvents of the drying oil solution. The swelled elastomer particles apparently give body to and thicken the composition while at the same time, inasmuch as the elastomer particles are dispersed in an aqueous phase, the swelling of the elastomer particles does not increase the tendencies of the composition to form webs between the stencil and the applied cement. To provide for sufficient but not excessive swelling of the elastomer particles, it is important that a solvent, where one is employed in the continuous phase, comprise a balanced blend of swelling solvents, e. g., aromatic solvents, and substantially nonswelling or only slightly swelling solvents, e. g., aliphatic solvents.

In preparing the continuous phase, a mineral filler, for example, titanium dioxide, which is nonhygroscopic, and insoluble in water and in the organic solvents used, is dispersed through a suitable portion of the liquid of the continuous phase. The liquid in which the filler is dispersed may be a drying or nondrying resin or oil or a plasticizer, or combinations thereof with or without added solvent. Suitably this dispersing may be carried out on a wet pigment mill. To the filler dispersion additional solvent may be added. Where the latex to be used is a latex of a copolymer of butadiene and styrene, the total solvents may comprise from about 25% to about 75% of swelling solvents, for example, aromatic solvents of the nature of xylol or toluol, and from 75% to about 25% of aliphatic solvents, such as petroleum naphtha. This ratio of proportions has been found to effect the desired swelling of the butadiene-styrene copolymer particles in the latex to give the desired body to the resulting composition without overly increasing the web-forming tendencies of the composition. Other proportions of swelling and nonswelling solvents may be employed where it is desired to effect controlled swelling of latices or dispersions of other elastomers.

To the filler dispersion thus prepared there is added with agitation the remaining nonvolatiles of the continuous phase. About ½ part to about 2 parts of a hardening liquid may be combined with each part of nondrying solids in the mixture. Any of the well-known natural or synthetic hardening or drying oils or resins, such as boiled linseed oil, alkyd resins, China-wood oil, or dehydrated castor oil, may be used. "Nondrying solids," as the term is used herein, include resins, plasticizers and pigments or fillers which are not chemically converted to higher melting state by subsequent treatment.

To the composition obtained there is added with stirring a latex or dispersion of an elastomer which may be a latex of copolymerized butadiene and styrene comprising from about 1% to about 50% of styrene, or may be a latex or aqueous dispersion of other materials, either resins, or natural rubber, or synthetic rubbers or mixtures of these capable of forming flexible films on surfaces to be flocked. Latices of from about 20% to about 60% solids are preferred but other solids content latices may be used. It appears that the finely dispersed mineral filler aids in breaking up the latex so that the latex is dispersed throughout the continuous phase of resin and drying oil solution as very fine droplets. Suitably a quantity of latex is added, such that the ratio of the solids content of the latex to the weight of the resin and drying oil of the solution is from about 1:1 to about 5:1. The dispersion thus formed is very viscous and may be diluted to the desired consistency for stencil flocking by adding a blend of aromatic and aliphatic solvents in the proportions required to provide satisfactory but not excessive swelling of the elastomer content of the latex.

A typical stencil flocking cement in accordance with the instant invention was prepared as follows:

Example I 100 parts by weight of titanium dioxide and 100 parts by weight of "Glyptal Solution #2477" obtained from General Electric Company and comprising 45% glycerine phthalic resin, 20% castor oil, serving as a plasticizer, and 35% xylol, were mixed together and the mixture ground on a wet pigment mill to effect the distribution of the fine particles of titanium dioxide throughout the resinous solution. To the resulting ground material there was added with stirring 400 parts by weight of a solvent blend comprising 10% of xylol, 50% of toluol and 40% of a petroleum naphtha solvent having a boiling range of from 85° C. to 130° C. 100 parts by weight of boiled linseed oil and 1½ parts of cobalt naphthenate were then added to 600 parts of the above oleo-resinous composition and the mixture was agitated to effect a thorough blending.

To the composition thus obtained there was added 1200 parts of uncured GR-S latex (a copolymer of butadiene and styrene comprising 28% of styrene), the latex containing about 40 parts of solids. The latex was dispersed through the material by vigorous agitation, the titanium dioxide assisting in breaking up the drops of the latex. The resulting product was a very viscous white liquid and to this liquid was added with stirring a solvent comprising 200 parts of toluol and 160 parts of a petroleum naphtha solvent (boiling range 85° C. to 130° C.).

The composition thus obtained was found to be exceptionally suitable for application through a stencil to a cloth surface. The stencil was readily removed after application of the material without objectionable webbing at the edges of the stencil. Flock applied to the adhesive-coated surface adhered readily. The cement became surface dry in about 4 hours at 120° F. so that it could withstand light brushing and suction cleaning. After drying for a period of about two days, it was found that the flock was adhered firmly in place and that the flocked fabric was stiffened only very little by the adhesive and flock covering. The adhesive was found to be resistant to the action of aqueous or "dry cleaning" cleansing agents.

Example II 32 pounds of titanium dioxide and 32 pounds by weight of "Duraplex E-71" were ground together on a wet pigment mill to effect distribution of the fine particles of titanium dioxide throughout the resinous material. Duraplex E-71 is a long oil, drying, alkyd type resin sold by the Resinous Products & Chemical Company, Philadelphia, Pa., containing about 18% phthalic anhydride, and having an acid number of from about 15 to 25. The ground mixture of titanium dioxide and resin was added to a mixture comprising 42⅔ pounds of Duraplex E-71, 2.54 pounds triethanolamine, 0.635 pound of cobalt naphthenate drier, 3 gallons of mineral spirits, and 9 gallons of Sovasol #3 (a high boiling naphtha). When the above ingredients were thoroughly mixed, there was slowly added with stirring 60 gallons of GR-S #3 latex (a 50% styrene-butadiene copolymer). The resulting product was a very viscous white liquid and to this liquid there was added with stirring a solvent comprising 12 gallons of toluol and 12 gallons of naphtha.

The composition obtained was found to be satisfactory for application through a stencil to a cloth surface. The stencil was readily removed after application of the material without objectionable webbing at the edges of the stencil and flock applied to the adhesive-coated surface adhered readily. The cement became surface dry in about 4 hours at 120° F. so that it could withstand light brushing and suction cleaning. After drying for a period of about 2 days it was found that the flock was adhered firmly in place and that the flocked fabric retained its desirable flexibility. The adhesive was found to be resistant to the action of aqueous or "dry cleaning" cleansing agents.

While there has been given a number of materials which applicant has found suitable in compounding his new type of stencil flocking cement, it will be understood that the invention is susceptible of many modifications within the scope of generic teaching. It is to be understood that the invention is not to be restricted to the specific examples given in the specification but is to be construed to include all subject-matter which may be held to come within the scope of the appended claims.

Having described my invention, what I claim as new and desire to secure by Letters Patent of the United States is:

1. An adhesive adapted for application to a surface of a fabric for adhering flock to the surface comprising droplets of a latex of a member of the group consisting of natural rubber and butadiene-styrene copolymers comprising from 1 to 50% of styrene dispersed in a non-aqueous continuous phase which includes a solution of a hardenable material from the group consisting of drying oil, drying oil-modified alkyd resin, and mixtures of these in a blend of volatile aromatic and aliphatic solvents for the drying oil, and a mineral filler distributed throughout the solution, said blend of aromatic and aliphatic solvents for the hardenable liquid in the ratio of from 75:25 to 25:75.

2. An adhesive adapted for application to a surface for adhering flock to the surface comprising droplets of a latex of a copolymer of butadiene and styrene comprising from 1% to 50% styrene dispersed in a non-aqueous continuous phase which includes a solution of a drying oil in a blend of volatile aromatic and aliphatic solvents for the drying oil in the ratio of from 75 to 25 to 25 to 75, and titanium dioxide distributed throughout the solution, the ratio by weight of the solids content of the latex to the drying oil being from 1:1 to 5:1.

3. An adhesive adapted for application to a surface of a fabric for adhering flock to the surface comprising droplets of a latex of a copolymer of butadiene and styrene comprising from 1% to 50% styrene dispersed in a non-aqueous continuous phase which includes a solution of a drying oil-modified alkyd resin in a blend of volatile aromatic and aliphatic solvents for the resin in a ratio of from 75 to 25 to 25 to 75, and titanium dioxide distributed throughout the solution the ratio by weight of the solids content of the latex to the resin being from 1:1 to 5:1.

4. A method of flocking comprising applying a stencil to the surface of a fabric, coating the exposed portions of the fabric with an adhesive comprising droplets of a latex of a copolymer of butadiene and styrene containing from 1% to 50% styrene dispersed in a non-aqueous continuous phase which includes a solution of a drying oil in a blend of solvents, and titanium dioxide distributed throughout the solution, said blend of solvents containing volatile aromatic and aliphatic solvents for the drying oil in a ratio of from about 75 to 25 to about 25 to 75, the ratio by weight of the solids content of the latex to the drying oil being from 1:1 to 5:1, removing the stencil from the surface of the fabric, and adhering flock to the adhesive on the surface of the fabric.

5. A method of flocking comprising applying a stencil to the surface of a porous fabric, coating the exposed portions of the fabric with an adhesive comprising droplets of a latex of a copolymer of butadiene and styrene containing from 1% to 50% styrene dispersed in a non-aqueous continuous phase which includes a solution of a drying oil-modified alkyd resin in a blend of volatile aromatic and aliphatic solvents for the resin in the ratio of from 75 to 25 to 25 to 75, and titanium dioxide distributed throughout the solution, the ratio by weight of the solids content of the latex to the resin being from 1:1 to 5:1, removing the stencil from the surface of the fabric, and adhering flock to the adhesive on the surface of the fabric.

6. An adhesive adapted for application to a surface of a fabric for adhering flock to the surface comprising droplets of a latex from the group consisting of copolymers of butadiene and styrene comprising from 1% to 50% styrene, and natural rubber, said latex being dispersed in a continuous non-aqueous phase which includes a solution of a hardenable material from the group consisting of drying oil, drying oil-modified alkyd resin, and mixtures of these in a blend of volatile aromatic and aliphatic solvents for the hardenable material in the ratio of from 75:25 to 25:75, and a solvent insoluble mineral filler dispersed through the solution, the ratio by weight of the solids content of the latex to the hardenable material being from 1:1 to 5:1.

7. A method of flocking comprising applying a stencil to the surface of a fabric, coating the exposed portions of the fabric with an adhesive comprising droplets of a latex from the group consisting of copolymers of butadiene and styrene comprising from 1% to 50% styrene, and natural rubber, said latex being dispersed in a continuous non-aqueous phase which includes a solution of a hardenable material from the group consisting of drying oil, drying oil-modified alkyd resin, and mixtures of these in a blend of volatile aromatic and aliphatic solvents for the hardenable material in the ratio of from 75:25 to 25:75, a solvent insoluble mineral filler dispersed through the solution, the ratio by weight of the solids content of the latex to the hardenable material being from 1:1 to 5:1, removing the stencil from the surface of the fabric and adhering flock to the adhesive on the surface of the fabric.

ROBERT W. MITCHELL.

REFERENCES CITED

The following references are of record in the file of this patent:

UNITED STATES PATENTS

| Number | Name | Date |
|---|---|---|
| 1,789,062 | Ayres | Jan. 13, 1931 |
| 1,861,003 | Foster | May 31, 1932 |
| 1,932,624 | Holmberg | Oct. 31, 1933 |
| 2,171,140 | Cornwell | Aug. 29, 1939 |
| 2,222,581 | Jenett | Nov. 19, 1940 |
| 2,348,674 | Dodge et al. | May 9, 1944 |
| 2,402,909 | Novak | June 25, 1946 |

OTHER REFERENCES

India Rubber World, March 1944, vol. 109, No. 6, page 578.